United States Patent [19]

Hamersley et al.

[11] Patent Number: 4,735,878

[45] Date of Patent: Apr. 5, 1988

[54] OPTICALLY READ RECORDING MEDIUM AND METHOD FOR MAKING SAME

[75] Inventors: Alan B. Hamersley, Orange; Michael W. Goff, La Mirada; Vinai K. Thummalapally, Anaheim; Thomas M. Whitworth, Huntington Beach; Ramchandra R. Nomula, Irvine, all of Calif.

[73] Assignee: Quixote Corporation, Chicago, Ill.

[21] Appl. No.: 901,896

[22] Filed: Aug. 28, 1986

Related U.S. Application Data

[62] Division of Ser. No. 710,919, Mar. 12, 1985.

[51] Int. Cl.⁴ .................. G03C 9/00; G03C 5/00; G01D 9/00
[52] U.S. Cl. ......................... 430/11; 430/14; 430/16; 430/313; 430/324; 430/945; 346/135.1
[58] Field of Search .................. 346/135.1; 430/11, 14, 430/16, 313, 324, 945

[56] References Cited

U.S. PATENT DOCUMENTS

| | | | |
|---|---|---|---|
| 3,615,465 | 10/1971 | Bullinger | 430/313 |
| 3,647,450 | 3/1972 | Calligaris et al. | 430/16 |
| 3,665,483 | 5/1972 | Becker et al. | 346/1 |
| 3,930,857 | 1/1976 | Bendz et al. | 430/313 |
| 4,069,487 | 1/1978 | Kajai et al. | 346/76 L |
| 4,179,532 | 12/1979 | Soeding | 427/54.1 |
| 4,195,313 | 3/1980 | Bell et al. | 179/100.1 G |
| 4,228,510 | 9/1981 | Tinet et al. | 430/11 |
| 4,285,056 | 8/1981 | Bell | 369/100 |
| 4,306,013 | 12/1981 | Roach et al. | 369/288 |
| 4,316,279 | 2/1982 | Russell et al. | 369/109 |
| 4,345,261 | 8/1982 | Wilkinson | 346/76 L |
| 4,363,844 | 12/1982 | Lewis et al. | 428/65 |
| 4,423,137 | 1/1982 | Rester | 430/320 |
| 4,443,533 | 4/1984 | Panico | 430/311 |
| 4,450,553 | 5/1984 | Holster et al. | 369/275 |
| 4,451,915 | 5/1984 | Labudde et al. | 369/109 |
| 4,477,555 | 10/1984 | Oba et al. | 430/273 |
| 4,493,887 | 1/1985 | Peeters et al. | 430/275 |
| 4,510,232 | 4/1985 | Gerber | 430/494 |
| 4,529,650 | 7/1985 | Martinez | 428/336 |
| 4,629,668 | 12/1986 | Hamersley et al. | 430/11 |
| 4,650,735 | 3/1987 | De Laat | 430/16 |

FOREIGN PATENT DOCUMENTS

| | | | |
|---|---|---|---|
| 0070809 | 6/1977 | Japan | 346/135.1 |
| 0086794 | 7/1981 | Japan | 346/135.1 |

OTHER PUBLICATIONS

Review and Analysis of Optical Recording Media, Bartolini et al., Optical Engineering, vol. 15, No. 2, pp. 99–105, Mar./Apr. 1976.

*Primary Examiner*—John E. Kittle
*Assistant Examiner*—Patrick J. Ryan
*Attorney, Agent, or Firm*—Willian Brinks Olds Hofer Gilson & Lione Ltd.

[57] ABSTRACT

An information recording medium includes a substrate having first and second sides. A layer of photoresist is deposited on the first side of the substrate. This layer of photoresist has a selected thickness and defines an area of openings therein such that the first side of the substrate is exposed at the openings, the openings being distributed in a pattern indicative of selected stored information. A reflecting layer is deposited on the photoresist layer and on the first side of the substrate at the openings. Both the substrate and the layer of photoresist are adapted to transmit the reading beam such that a portion of the reading beam incident on the second side of the substrate is reflected out of the substrate by the reflecting layer, both in a first region comprising the openings and in a second region between the openings. The selected thickness of the photoresist is chosen to provide destructive interference between the portions of the reading beam reflected out of the substrate by the reflecting layer in the first and second regions. Methods for forming such a recording medium by photolithographic techniques are disclosed.

25 Claims, 3 Drawing Sheets

OPTICALLY READ RECORDING MEDIUM AND METHOD FOR MAKING SAME

This application is a division of application Ser. No. 06710,919, filed Mar. 12, 1985.

BACKGROUND OF THE INVENTION

The present invention relates to an improved optically read recording medium, and to methods for making such a medium. The recording medium of this invention is well suited for use as a video or audio disc.

In the past, a variety of techniques have been used to manufacture optically read recording media, including both mechanical and photolithographic techniques. Conventional video and audio discs (such as compact discs) are typically made by a mechanical pressing operation in which $\frac{1}{4}$ wavelength pits are physically stamped into the recording medium. Commonly assigned U.S. Pat. No. 4,423,137 discloses a method for fabricating recording media photolithographically. This photolithographic approach eliminates the significant drawbacks encountered with conventional stamping techniques.

Although the photolithographic approach described in U.S. Pat. No. 4,423,137 is well suited for a wide variety of applications, it produces a recording medium which does not rely on destructive interferencd during the reading operation. This is because the recording medium described in this patent includes transmissive holes which pass the reading beam rather than reflecting it with a suitable phase offset. There are reading devices, such as certain compact disc players, which utilize phase differences between the reading beam reflected from various portions of the recording medium for control purposes.

The present invention is directed to an improved recording medium which retains the important advantages of photolithographic processing, while providing a recording medium that relies on phase cancellation techniques for the reading process.

SUMMARY OF THE INVENTION

According to this invention, an information recording medium adapted for use with a reading beam is provided which comprises a substrate having first and second sides. A layer of a photoresist is deposited on the first side of the substrate, and this layer of photoresist defines an array of depressions therein such that the region of the photoresist is divided into first and second regions of varying thickness. In the presently preferred embodiment, the first region is actually an array of openings formed in the layer of photoresist such that the first side of the substrate is exposed at the openings. The first and second regions are distributed in a pattern indicative of selected stored information such as audio information, video information, or both. A reflecting layer is deposited over the photoresist layer, and on the first side of the substrate at the openings if the depressions form openings in the photoresist. Both the substrate and the layer of photoresist are adapted to transmit the reading beam such that a portion of the reading beam incident on the second side of the substrate is reflected out of the substrate by the reflecting layer both in the first region comprising the depressions, and in the second region between the depressions. The differential spacing of the reflecting layer in the first and second regions is chosen to provide destructive interference between the portions of the reading beam reflected out of the substrate by the reflecting layer in the first and second regions.

According to the method of this invention, information for subsequent reading by a reading beam is recorded by first providing a substrate having first and second sides and adapted to transmit the reading beam. The first side of the substrate is then coated with a layer of a photoresist adapted to transmit the reading beam. Then portions of the layer of photoresist are exposed to create first and second regions which differ in exposure. At least a portion of the thickness of the photoresist is removed in the first region in order to create a differential photoresist thickness between the first and second regions. In the preferred embodiment, the entire thickness of the photoresist is removed in the first region to expose portions of the first side of the substrate underlying the first region. Then the remaining photoresist (and any exposed portions of the first side of the substrate) are covered with a reflecting layer adapted to reflect the reading beam. The selected thickness differential of the layer of photoresist between the first and second regions is adapted to create destructive interference on the second side of the substrate between the reading beam reflected from the reflecting layer overlying the first and second regions.

The method of this invention can be adapted for use with either modulated laser or contact exposure techniques. This method retains the important advantages of photolithographic processing, and completely avoids problems associated with stamping and pressing operations. Furthermore, the preferred embodiments described below are read through the substrate and through the remaining photoresist. This back side reading technique provides the important advantage that the active surface of the reflecting layer is never exposed to contamination once it is deposited. This is because it is the underside of the reflecting layer (the surface adjacent to the photoresist) which is the active, reflective surface. Once this side of the reflecting layer is deposited, it is never exposed during subsequent processing operations. Furthermore, the preferred embodiment described below can be implemented with a relatively small number of processing steps, and it is well suited as an economical fabrication technique both for replica discs and for single copies made by modulated laser.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
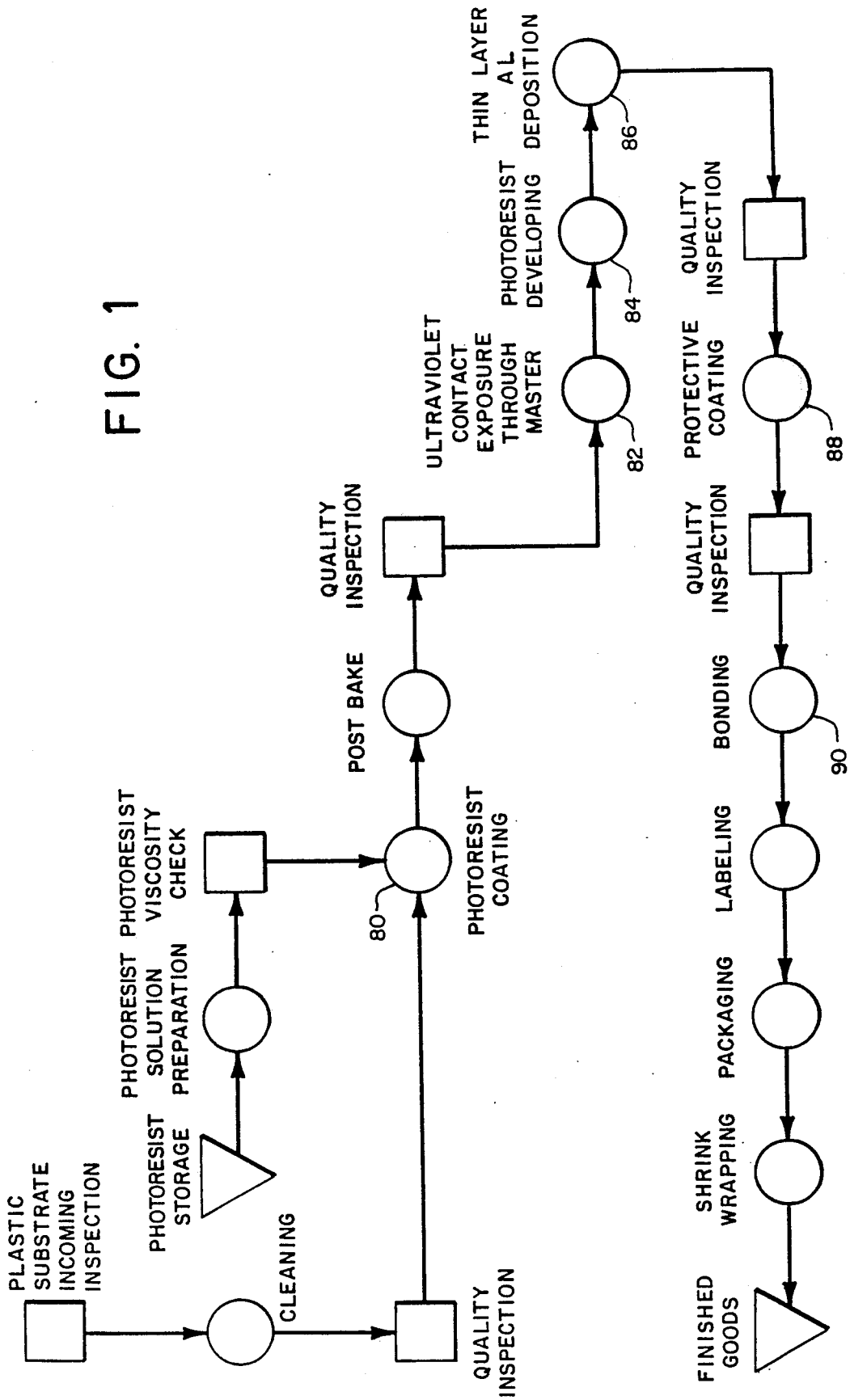
FIG. 1 is a process flow diagram of a first preferred embodiment of the fabrication process of this invention.
Figure 1A:
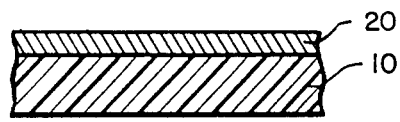
FIGS. 1a–1f are cross-sectional views taken through the recording medium at various stages in the fabrication process of FIG. 1.
Figure 1B:
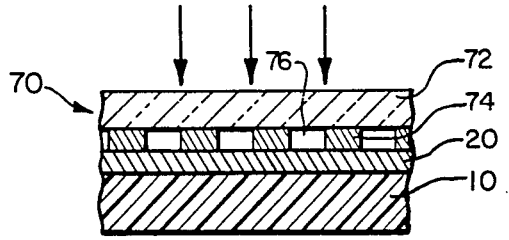
Figure 1C:
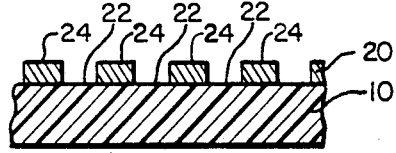
Figure 1D:
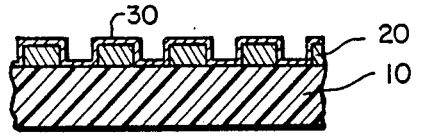
Figure 1E:
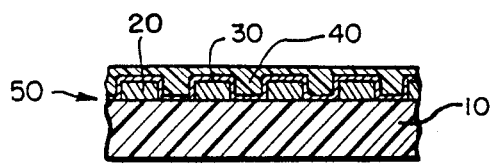
Figure 1F:
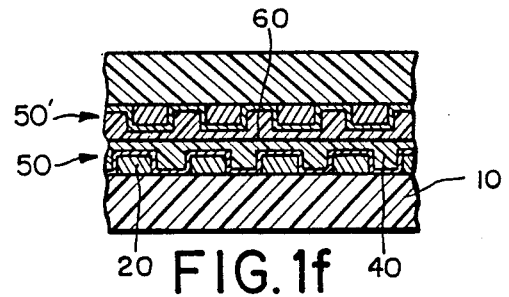
Figure 2A:
FIGS. 2a–2f are cross-sectional views through the recording medium at various stages in the fabrication process of FIG. 2.
Figure 2B:
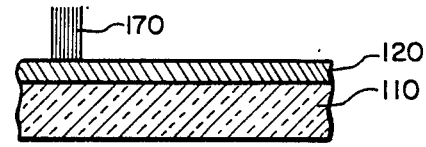
Figure 2C:
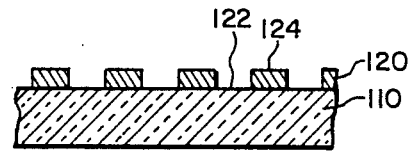
Figure 2D:
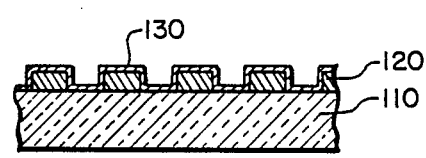
Figure 2E:
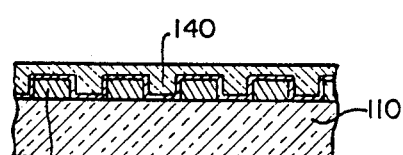
Figure 2F:
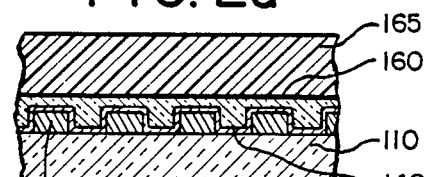
Figure 2:
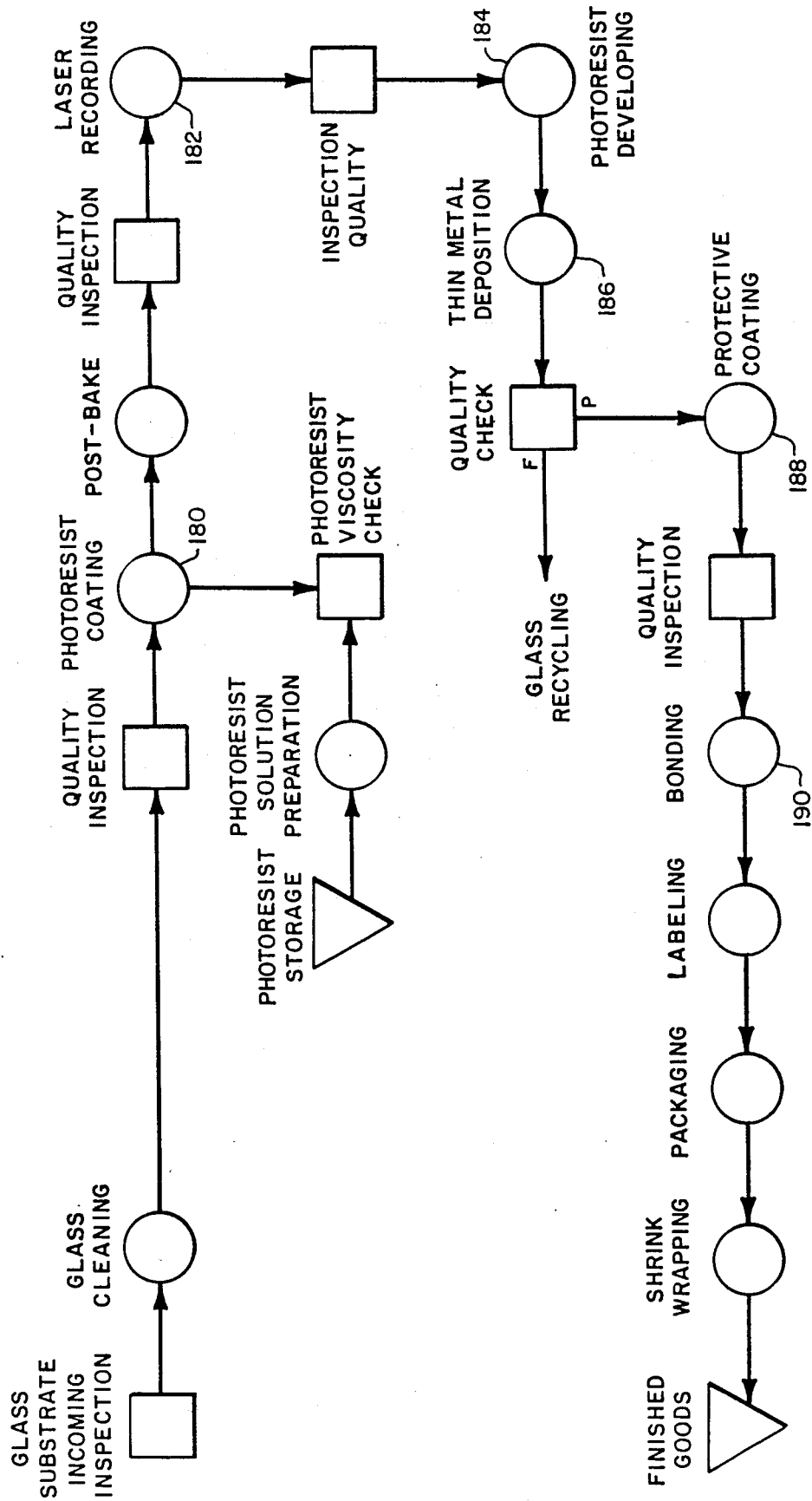
FIG. 2 is a process flow diagram of a second preferred embodiment of the fabrication process of this invention.

Turning now to the drawings, FIGS. 1–1f relate to a first preferred embodiment of the method and recording medium of this invention, and FIGS. 2-2f relate to a second preferred embodiment of the method and recording medium of this invention.

The First Preferred Embodiment

The method of FIG. 1 utilizes contact exposure techniques through a master to form a recording medium such as a video or audio disc. The first step in the method of FIG. 1 is to inspect the substrate to be used for the recording medium. In this embodiment, the substrate 10 is an optical grade plastic substrate which can, for example, be formed of PMMA/polycarbonate or cast epoxy. In the event the substrate 10 is intended for use as a video disc, it preferably has a thickness of 1.2 mm, an outside diameter of either 200 or 300 mm (depending on the application), and an inside diameter of 35 mm. In the event the substrate 10 is intended for use as a compact disc, the thickness of the substrate should preferably be 1.2 mm, the outside diameter 120 mm, and the inside diameter 15 mm. In the initial inspection step, the substrate 10 is tested for optical surface characteristics and flatness.

The substrate 10 is then cleaned using a mild soap solution to remove particulate contamination, followed by a series of deionized water baths. The cleaned substrate is then inspected visually for contamination.

The process steps labeled photoresist, storage, solution preparation and viscosity check relate to the preparation of a suitable photoresist, which in this preferred embodiment is a positive photoresist such as that marketed as Shipley 1400 Series. Preferably, this photoresist should be diluted to a solids content of 3%. If obtained directly from Shipley, a suitable product is Shipley Photoresist 1400-3. The viscosity of this photoresist is preferably 1.37 centistokes at 25° C.

Process step 80 is a photoresist coating step in which the substrate 10 is coated with a layer of photoresist 20 to form the structure shown in FIG. 1a. In this preferred embodiment, the coating step 80 is performed at a temperature of about 20° C. and a relative humidity of about 50%. A spin coating technique can be used in which a movable arm is used to dispense photoresist onto the rotating substrate 10 at a low speed of about 100 rpm. Then the rotational speed of the substrate 10 is accelerated to about 350 rpm in order to spin off the photoresist to form a layer of the desired thickness. In this preferred embodiment, the final thickness of the resist 20 is approximately 1200 Angstroms. Following the coating step 80, the substrate 10 and photoresist 20 are baked in a HEPA filtered convection oven at a temperature of 70° C. for thirty minutes, and the resulting article is then visually inspected for particulate contamination. On a periodic basis, the thickness of the baked photoresist 20 is checked to ensure that it is at the desired 1200 Angstrom thickness.

The coated substrate of FIG. 1a is then exposed in a contact exposure step 82, as shown in FIG. 1b. During this exposure step 82 the photoresist layer 20 is brought into contact with a chrome master. The formation of the master does not form part of this invention and will not, therefore, be described in detail here. A suitable master can be formed by the process described in commonly assigned U.S. Pat. No. 4,423,137. In this embodiment, the exposure step is performed with an exposing radiation having a wavelength of 400 nanometers. The exposure time is approximately 1.5 seconds, and the ultraviolet light source generates approximately 400 mw/cm². This exposure step 82 generates first and second regions of the photoresist 20, which differ in their degree of exposure. In particular, the master 70 includes a substrate 72 which is transparent and a metal layer 74 which defines an array of openings 76 therein. The regions of the photoresist 20 aligned with the openings 76 are exposed to ultraviolet radiation, while the regions of photoresist 20 aligned with the metal layer 74 are not.

The exposed photoresist 20 is then removed in a developing bath in developing step 84. Preferably, a photoresist developer such as that marketed by Shipley as Microposit 351 at a concentration of 0.27–0.29 N, a temperature of 20° C., and a time of 25 seconds, is used. In this embodiment, the exposed photoresist is dipped in an agitated tank of the developer. After the developing step 84 has been completed, the resulting developed photoresist forms a pattern as shown in FIG. 1c. This pattern includes first regions 22 which were exposed and have been removed from by the action of the developer, as well as second regions 24 in which the unexposed photoresist 20 has remained. The first regions 22 in this preferred embodiment are actually openings in the layer of photoresist 20 at which the substrate 10 is exposed.

A thin reflecting layer 30 of a metal such as aluminum is then deposited over the developed photoresist in a deposition step 86 to produce the structure shown in FIG. 1d. This reflecting layer 30 extends over both the first and second regions 22,24, and covers exposed portions of the substrate 10 formed at the openings in the photoresist layer 20. After the reflecting layer 30 has been formed, the structure is visually inspected to ensure an absence of pinholes. In this preferred embodiment, the reflecting layer 30 is formed of aluminum, and has a reflectivity of 75–85%. Other metals, such as copper or gold, can be used in alternate embodiments. In this embodiment, the reflecting layer 30 is vapor deposited onto the substrate 10. For example, a Stokes Vacuum Metallizer Model 426-6, with a 48-inch diameter chamber, may be used.

In process step 88 a protective coating 40 is applied over the reflecting layer 30 to form the structure of FIG. 1e. This protective coating 40 may be for example a UV curable polymer which is coated either with spin coating or roller coating techniques. A suitable polymer is marketed by Dai Nippon Ink Company of Japan as Polymer SD/17. Preferably, the thickness of the protective layer 40 is controlled to 10 microns. This polymer is preferably UV cured with a UV light source such as that marketed by American Ultraviolet Company, having an intensity of 200 watts per meter, an arc length of 25 inches, and a position 6 inches above the substrate 10. Preferably, the substrate 10 is passed under this light source on a conveyor having a linear speed of 240 inches per minute.

The structure shown in FIG. 1e is a completed recording medium 50 which can be read through the substrate 10. An incident reading beam directed onto the substrate 10 is reflected off of the reflecting layer 30 both in the first regions 22 and in the second regions 24. The difference in optical path length in these two regions is chosen such as to provide destructive interference of the reading beam when reflected from these two portions of the reflecting layer 30. Following the coating step 88, the recording medium is inspected by reading the stored information to confirm the accuracy of the recording operation.

In this preferred embodiment, the finished recording medium 50 of FIG. 1e is bonded to a second finished recording medium 50' by an adhesive layer 60 to form a finished disc. This is accomplished in step 90 of FIG. 1. In this embodiment, the adhesive layer 60 can be for example the adhesive marketed by 3M as Adhesive No. 4696. In this way, a double-sided recording medium is obtained.

Following the bonding step 90, suitable pressure-sensitive adhesive labels are applied to the finished disc to identify the recorded program, the disc is inserted into a sleeve and jacket to protect it from contamination and scratches, and the finished package is shrink-wrapped.

The Second Preferred Embodiment

Turning now to FIGS. 2-2f, the second preferred embodiment shown in FIG. 2 is similar in many respects to the first preferred embodiment of FIG. 1. However, the embodiment of FIG. 2 utilizes a modulated light source to expose the photoresist, as well as a different type of a substrate.

As shown in FIG. 2, the first step is to inspect the incoming substrate 110. In this preferred embodiment, the substrate 110 is an optical grade glass disc having physical dimensions identical to the substrate 10 described above. Following incoming inspection, the substrate 110 is cleaned in a series of detergent, deionized water, alcohol and freon baths.

The substrate 110 is then visually inspected for contamination, and a layer of photoresist 120 having a thickness of 1200 Angstroms is deposited on the substrate 10 in a coating step 180. The same photoresist and coating techniques can be used as those described above. The coating step 180 produces the structure shown in FIG. 2a. This structure is baked in a HEPA filtered convection oven at 90° C. for approximately 30 minutes, and is then visually inspected for particulate contamination. In addition, the thickness of the photoresist 120 is checked.

In this embodiment, the baked photoresist 120 is exposed in a laser recording step 182, as shown in FIG. 2b. In this step 182, a time modulated laser writing beam 170 is used to expose selected regions 122 of the photoresist 120. In this preferred embodiment, the modulated laser beam 170 is generated with an argon ion laser having a rated power of 350 milliwatts, a running power of 75 to 250 milliwatts, operating at a wave length of 457.9 nanometers. In this embodiment, an exposing spot size having a radial dimension of 0.5 microns and a tangential dimension of 0.35 microns is generated via a lens such as Olympus objective lens 1990 having a numerical aperture of 0.95. Laser beam modulation can be obtained, for example, with a modulator of the type marketed by Coherent as Model 3050.

The exposed photoresist is then developed in step 184 to produce the structure shown in FIG. 2c in which the exposed regions 122 of the photoresist 120 have been removed, and the unexposed regions 124 of the photoresist 120 remain. The developing step 184 can be accomplished with the developer marketed by Shipley as Microposit 351, at a concentration of 0.27-0.29 N, a temperature of 20° C. and a time of 15 seconds. In this embodiment, the spray method of development is preferably employed.

In the next process step 186, a thin layer (approximately 1200 Angstroms in thickness) of aluminum is deposited on the photoresist 120 to produce the structure shown in FIG. 2d. In this embodiment, the same vapor deposition techniques as those described above may be used, and the reflectivity of the reflecting layer 130 is selected at 75-85%. The structure of FIG. 2d is then visually inspected for pinholes. If excessive pinholes are found, the glass substrate 110 is recycled. Otherwise a protective coating 140 is applied in step 188. In this embodiment, a spin coating technique is used, and the same UV curable polymer and UV curing techniques as those described above are preferably used. At this point, the structure of FIG. 2e is generated, which is a finished recording medium 50 that can be read from the exposed surface of the substrate 110. Preferably, the recording medium 50 is inspected by optically reading the stored information to confirm the accuracy of the recording process.

In process step 190, the recording medium 50 is bonded to a plastic substrate 165 to provide a finished disc having the desired thickness, strength and weight. In this embodiment, the bonding step 190 is performed with an adhesive layer 160 such as that marketed by 3M as Adhesive No. 4693. As before, the finished disc is labeled, packaged and wrapped to complete the process of FIG. 2.

Conclusion

It should be apparent from the foregoing discussion that two preferred embodiments have been described, both of which utilize photolithographic techniques to generate an optically read recording medium having important advantages. It should be understood that the present invention is not limited to the specific materials or process parameters described above. Furthermore, it is not critical in all applications that the entire thickness of the exposed photoresist be removed. If desired, negative photoresist may well be substituted for the positive photoresist described above, or the photoresist may be utilized in such a manner that the exposed region of the photoresist is only removed in part to form depressions which create the desired difference in optical path length of the reading beam. Furthermore, a wide variety of materials can be used as the photoresist layer. As used in this specification and the following claims, the term "photoresist" is intended to be interpreted broadly to encompass the entire class of materials that can be developed following an exposure operation to create first and second regions of varying thickness.

It is therefore intended that the foregoing detailed description be regarded as illustrative rather than limiting, and that it be understood that it is the following claims, including all equivalents, which are intended to define the scope of this invention.

We claim:

1. A method for recording information and for subsequently reading the stored information with a reading beam, said method comprising the following steps:
    (a) providing a substrate having first and second sides and comprising a first material which transmits the reading beam;
    (b) coating the first side of the substrate with a layer of a photoresist comprising a second material which transmits the reading beam;
    (c) exposing portions of the layer of photoresist to create a pattern of first and second regions which differ in exposure;
    (d) removing at least a portion of the layer of the photoresist in the first region to create depressions having selected depth;

(e) depositing a reflecting layer over both the depressions and the second region of the layer of photoresist, said reflecting layer comprising a third material which reflects the reading beam; and (f) directing the reading beam against the second side of the substrate, through the substrate and the remaining portions of the layer of photoresist, onto the reflecting layer to read the pattern of the first and second regions, said selected depth of said depressions selected to create destructive interference on the second side of the substrate between (a) the portion of the reading beam reflected from the reflecting layer overlying the depressions and (b) the portion of the reading beam reflected from the reflecting layer overlying the second regions of the layer photoresist.

2. The method of claim 1 wherein the exposing steps comprises the step of contact exposing the layer of photoresist through a master.

3. The method of claim 1 wherein the exposing step comprises the step of subsequentially exposing the layer of photoresist with a time modulated laser light source.

4. The method of claim 1 wherein the reflecting layer comprises a metal layer and wherein step (e) comprises a vacuum deposition step.

5. The method of claim 1 wherein the pattern created in step (c) comprises a pattern of stored audio information, and wherein the coated substrate formed in step (e) comprises an audio disc.

6. The method of claim 1 wherein the pattern created in step (c) comprises a pattern of stored video information, and wherein the coated substrate of step (e) comprises a video disc.

7. The method of claim 1 wherein the selected thickness of the photoresist layer is about 0.12 microns.

8. The method of claim 1 wherein the reflecting layer has a reflectivity greater than 75%.

9. The method of claim 1 further comprising the step of coating the reflecting layer with a protective layer to protect the reflecting layer from physical damage.

10. The method of claim 1 wherein the pattern created in step (c) comprises a pattern of stored information, and wherein the method further comprises the step of applying at least one additional layer to the reflecting layer, said at least one additional layer effective to inhibit reading of the information from the first side of the substrate.

11. The method of claim 1 wherein the depressions created in step (d) extend completely through the layer of photoresist, and wherein the reflecting layer is deposited onto the first side of the substrate in the first region.

12. The method of claim 1 wherein the photoresist situated between the reflecting layer and the substrate after step (e) is unexposed.

13. The method of claim 9 wherein the protective layer comprises a polymer.

14. The method of claim 9 wherein the protective layer comprises a UV curable polymer.

15. The method of claim 10 wherein the at least one additional layer comprises a polymer layer.

16. The method of claim 15 wherein the at least one additional layer comprises a UV curable polymer layer.

17. A method for recording information and for subsequently reading the recorded information with a reading beam, said method comprising the following steps:

(a) providing a substrate having first and second sides and comprising a first material which transmits the reading beam;

(b) spin coating the first side of the substrate with a layer of a photoresist comprising a second material which transmits the reading beam;

(c) exposing portions of the layer of photoresist to create a pattern of exposed first regions and unexposed second regions;

(d) removing the layer of photoresist in the exposed first regions to expose the substrate underlying the first regions;

(e) depositing a reflecting layer by vacuum deposition over both the exposed substrate and the second regions of the layer of unexposed photoresist, said reflecting layer comprising a metal which reflects the reading beam;

(f) coating the reflecting layer with a polymer layer to protect the reflecting layer from physical damage; and (g) directing the reading beam against the second side of the substrate, through the substrate and the remaining portions of the layer of photoresist, onto the reflecting layer to read the pattern of the first and second regions, the thickness of the layer of photoresist selected to create destructive interference on the second side of the substrate between the portion of the reading beam reflected from the reflecting layer overlying the substrate and the portion of the reading beam reflected from the reflecting layer overlying the second regions of the layer of photoresist.

18. The method of claim 17 wherein the exposing step comprises the step of contact exposing the layer of photoresist through a master.

19. The method of claim 17 wherein the exposing step comprises the step of subsequentially exposing the layer of photoresist with a time modulated laser light source.

20. The method of claim 17 wherein the pattern created in step (c) comprises a pattern of stored audio information, and wherein the coated substrate formed in step (f) comprises an audio disc.

21. The method of claim 17 wherein the pattern created in step (c) comprises a pattern of stored video information, and wherein the coated substrate of step (f) comprises a video disc.

22. The method of claim 17 wherein the selected thickness of the photoresist layer is about 0.12 microns.

23. The method of claim 17 wherein the reflecting layer has a reflectivity greater than 75%.

24. The method of claim 17 wherein the polymer layer inhibits reading of the pattern of the first and second regions from the first side of the substrate.

25. The method of claim 17 wherein the polymer layer comprises a UV curable polymer.

* * * * *